(12) United States Patent
Lim et al.

(10) Patent No.: US 11,601,791 B2
(45) Date of Patent: Mar. 7, 2023

(54) METHOD FOR PAIRING DEVICES USING NEAR FIELD COMMUNICATION AND ELECTRONIC APPARATUS USING SAME

(71) Applicant: Samsung Electronics Co., Ltd., Suwon-si (KR)

(72) Inventors: Sungjae Lim, Suwon-si (KR); Woowon Park, Suwon-si (KR); Jaehong Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 248 days.

(21) Appl. No.: 17/049,318

(22) PCT Filed: Mar. 13, 2019

(86) PCT No.: PCT/KR2019/002885
§ 371 (c)(1),
(2) Date: Oct. 20, 2020

(87) PCT Pub. No.: WO2019/203443
PCT Pub. Date: Oct. 24, 2019

(65) Prior Publication Data
US 2021/0409924 A1 Dec. 30, 2021

(30) Foreign Application Priority Data
Apr. 20, 2018 (KR) .................. 10-2018-0046116

(51) Int. Cl.
*H04W 4/00* (2018.01)
*H04W 4/80* (2018.01)
(Continued)

(52) U.S. Cl.
CPC ............ *H04W 4/80* (2018.02); *G06Q 20/206* (2013.01); *H04W 12/50* (2021.01); *H04W 76/14* (2018.02)

(58) Field of Classification Search
CPC ....... H04W 4/80; H04W 12/50; H04W 76/14; G06Q 20/206; H04B 7/26; H04B 5/00; H04B 5/0056
(Continued)

(56) References Cited

U.S. PATENT DOCUMENTS 9,554,061 B1 * 1/2017 Proctor, Jr. ................ H04S 7/00
9,820,323 B1 * 11/2017 Young ................... H04W 84/18
(Continued)

FOREIGN PATENT DOCUMENTS

| KR | 10-2013-0141039 A | 12/2013 |
|---|---|---|
| KR | 10-2014-0029342 A | 3/2014 |

(Continued)

OTHER PUBLICATIONS

International Search Report dated Jun. 20, 2019 in connection with International Patent Application No. PCT/KR2019/002885, 2 pages.
Written Opinion of the International Searching Authority dated Jun. 20, 2019 in connection with International Patent Application No. PCT/KR2019/002885, 5 pages.

*Primary Examiner* — Marceau Milord (57) ABSTRACT

Various embodiments of the present invention pertain to a method for pairing devices using near field communication and an electronic apparatus using the same. The electronic apparatus comprises: a first wireless communication module supporting first wireless communication; a second wireless communication module supporting second wireless communication; a memory; and a processor operatively connected to the first wireless communication module, the second wireless communication module and the memory, wherein the processor is set to: detect a tag of an external electronic apparatus via the first wireless communication module; transmit a first command for driving a designated application of the external electronic apparatus to the external electronic apparatus via the first wireless communication
(Continued)

module; receive, via the first wireless communication module, Bluetooth address information of the external electronic apparatus corresponding to the driving of the designated application; and perform, via the second wireless communication module, pairing with the external electronic apparatus on the basis of the received Bluetooth address information, wherein the pairing is performed in a tagging manner instead of a scanning manner during the pairing of the electronic apparatus with the external electronic apparatus, to thereby intuitively select the external electronic apparatus to be paired and simply perform a pairing process. Various other embodiments are possible.

15 Claims, 7 Drawing Sheets

(51) Int. Cl.
  *H04W 76/14* (2018.01)
  *H04W 12/50* (2021.01)
  *G06Q 20/20* (2012.01)
(58) Field of Classification Search
  USPC .......................................................... 370/329
  See application file for complete search history.

(56) References Cited

U.S. PATENT DOCUMENTS

| | | | |
|---|---|---|---|
| 2012/0208461 A1 | 8/2012 | Choi et al. | |
| 2013/0210360 A1* | 8/2013 | Ljung | H04W 4/80 455/41.2 |
| 2014/0181683 A1* | 6/2014 | Lim | H04L 63/108 715/740 |
| 2015/0351143 A1* | 12/2015 | Seymour | H04R 25/554 455/41.2 |
| 2016/0105924 A1 | 4/2016 | Baek et al. | |
| 2016/0150350 A1* | 5/2016 | Ingale | H04W 4/38 370/255 |
| 2016/0212194 A1* | 7/2016 | Palin | H04W 4/80 |
| 2016/0267310 A1* | 9/2016 | AlNasser | G06F 1/1698 |
| 2017/0004485 A1 | 1/2017 | Lee et al. | |
| 2017/0126262 A1* | 5/2017 | Zakaria | H04W 4/80 |
| 2017/0127304 A1* | 5/2017 | Britt | H04W 24/08 |
| 2020/0350989 A1* | 11/2020 | Llewelyn | H04L 51/10 |

FOREIGN PATENT DOCUMENTS

| | | |
|---|---|---|
| KR | 10-2016-0042569 A | 4/2016 |
| KR | 10-2017-0004400 A | 1/2017 |
| KR | 10-2017-0071334 A | 6/2017 |
| KR | 10-2017-0138383 A | 12/2017 |

\* cited by examiner

METHOD FOR PAIRING DEVICES USING NEAR FIELD COMMUNICATION AND ELECTRONIC APPARATUS USING SAME

CROSS-REFERENCE TO RELATED APPLICATIONS

This application is a 371 of International Application No. PCT/KR2019/002885 filed on Mar. 13, 2019, which claims priority to Korean Patent Application No. 10-2018-0046116 filed on Apr. 20, 2018, the disclosures of which are herein incorporated by reference in their entirety.

BACKGROUND

1. Field

Various embodiments of the disclosure relate to a method for pairing devices using near field communication (e.g., near field communication (NFC)) and an electronic apparatus using the same.

2. Description of Related Art

As the use of electronic apparatuses, such as portable terminals, increases, various functions are provided to the electronic apparatuses.

The electronic apparatuses can transmit and receive various data after pairing with an external electronic apparatus (e.g., a wearable device such as a headset or a smart watch) through near field wireless communication.

For example, the electronic apparatus may perform mobile payment or home network through pairing with an external electronic apparatus.

When pairing between an electronic apparatus and an external electronic apparatus, the electronic apparatus may scan peripheral external electronic apparatuses that can be paired and display a list of external electronic apparatuses that can be paired.

In this case, the user of the electronic apparatus may have difficulty in intuitively finding an external electronic apparatus that is desired to be paired in the list.

In addition, even if an external electronic apparatus desired to be paired is selected from the list, it may be inconvenient to perform a complex pairing authentication process.

Various embodiments of the disclosure can provide an electronic apparatus and method capable of intuitively selecting an external electronic apparatus desired to be paired by performing pairing in a tagging method rather than a scan method when pairing an electronic apparatus and an external electronic apparatus.

Various embodiments of the disclosure can provide a method for easily performing a pairing process of an electronic apparatus and an external electronic apparatus by performing pairing in a tagging method when pairing the electronic apparatus and the external electronic apparatus.

SUMMARY

An electronic apparatus according to various embodiments may include a first wireless communication module supporting a first wireless communication, a second wireless communication module supporting a second wireless communication, a memory, and a processor operatively connected to the first wireless communication module, the second wireless communication module, and the memory, wherein the processor may be configured to: detect a tag of an external electronic apparatus through the first wireless communication module; transmit a first command for driving a designated application of the external electronic apparatus to the external electronic apparatus through the first wireless communication module; receive Bluetooth address information of the external electronic apparatus corresponding to the driving of the designated application through the first wireless communication module; and perform pairing with the external electronic apparatus through the second wireless communication module on the basis of the received Bluetooth address information.

A method for pairing according to various embodiments of the disclosure may include: detecting a tag of an external electronic apparatus through a first wireless communication module; transmitting a first command for driving a designated application of the external electronic apparatus to the external electronic apparatus through the first wireless communication module; receiving a first response signal indicating that the designated application is executed from the external electronic apparatus through the first wireless communication module; transmitting a second command for requesting Bluetooth address information of the external electronic apparatus through the first wireless communication module; receiving the Bluetooth address information through the first wireless communication module; and performing pairing with the external electronic apparatus through a second wireless communication module, based on the Bluetooth address information.

An electronic apparatus according to various embodiments may include a first wireless communication module supporting a first wireless communication, a second wireless communication module supporting a second wireless communication, a memory, and a processor operatively connected to the first wireless communication module, the second wireless communication module, and the memory, wherein the processor may be configured to: receive a first command for driving a designated application stored in the memory from the external electronic apparatus through the first wireless communication module; drive the designated application; transmit a response signal for the first command through the first wireless communication module; receive a second command for requesting Bluetooth address information of the electronic apparatus from the external electronic apparatus through the first wireless communication module; and perform pairing with the external electronic apparatus through a second wireless communication module.

According to various embodiments of the disclosure, when pairing an electronic apparatus and an external electronic apparatus, by performing pairing in a tagging method rather than a scanning method, the external electronic apparatus desired to be paired can be intuitively selected and the pairing process can be easily performed.

DETAILED DESCRIPTION

Figure 1:
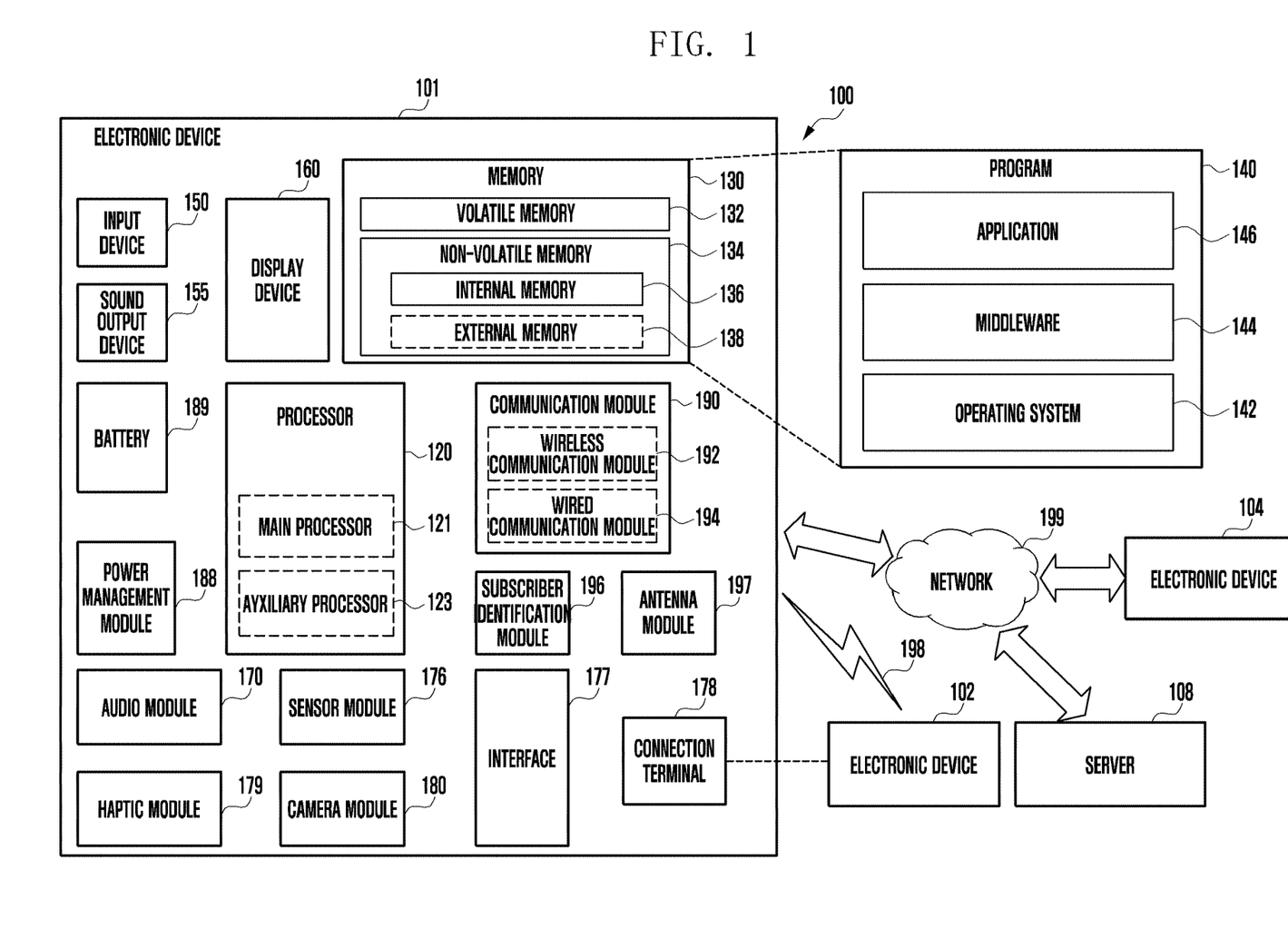
FIG. 1 is a block diagram of an electronic apparatus in a network environment according to various embodiments.

FIG. 1 is a block diagram illustrating an electronic device 101 in a network environment 100 according to certain embodiments.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform certain data processing or computation. According to an embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store certain data used by at least one component (e.g., the processor 120 or the sensor module 176) of the electronic device 101. The certain data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, or a keyboard.

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These certain types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit/receive a signal or power to/from an external entity (e.g., an external electronic device). According to some embodiments, the antenna module 197 may be formed of a conductor or a conductive pattern and may further include any other component (e.g., RFIC). According to an embodiment, the antenna module 197 may include one or more antennas, which may be selected to be suitable for a communication scheme used in a specific communication network, such as the first network 198 or the second network 199 by, for example, the communication module 190. Through the selected at least one antenna, a signal or power may be transmitted or received between the communication module 190 and the external electronic device.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
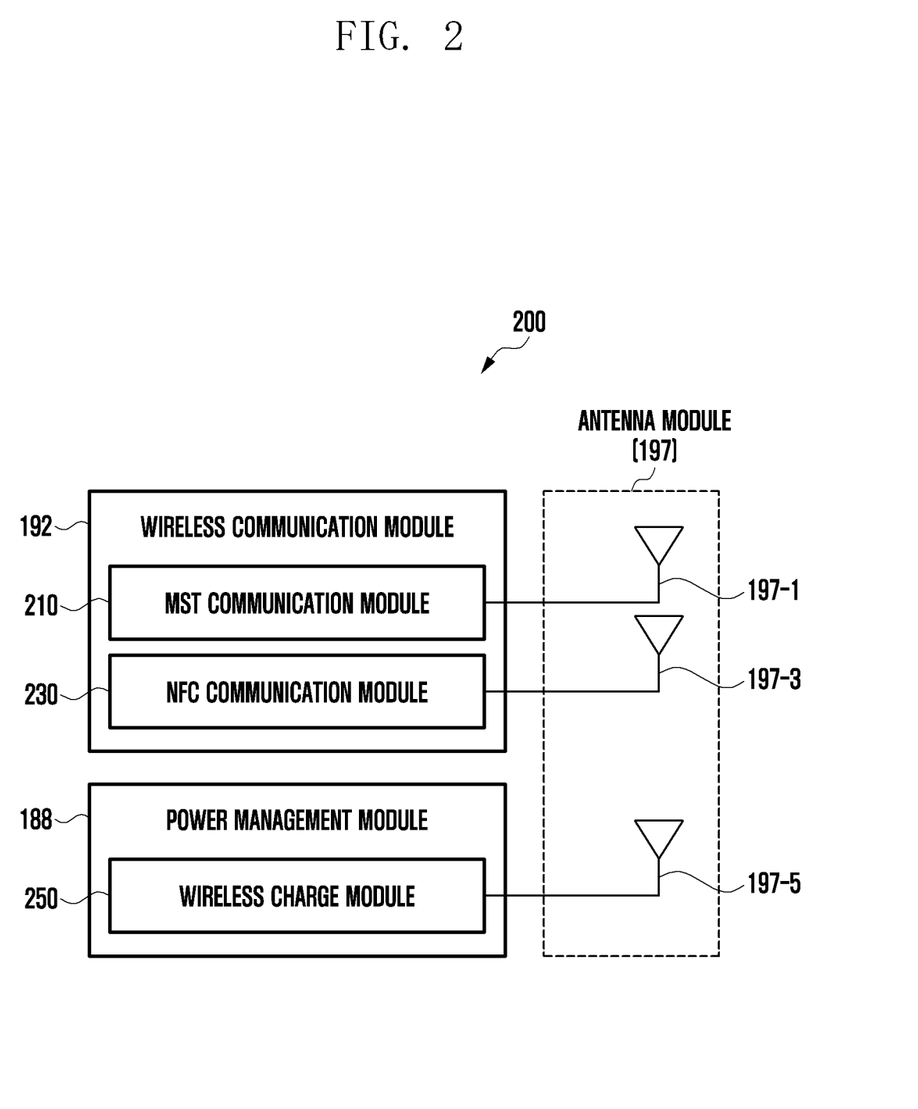
FIG. 2 is a block diagram of a wireless communication module, a power management module, and an antenna module of an electronic apparatus according to various embodiments.

FIG. 2 is a block diagram 200 illustrating the wireless communication module 192, the power management module 188, and the antenna module 197 of the electronic device 101 according to various embodiments.

Referring to FIG. 2, the wireless communication module 192 may include a magnetic secure transmission (MST) communication module 210 or a near-field communication (NFC) module 230, and the power management module 188 may include a wireless charging module 250. In such a case, the antenna module 197 may include a plurality of antennas that include a MST antenna 197-1 connected with the MST communication module 210, a NFC antenna 197-3 connected with the NFC communication module 230, and a wireless charging antenna 197-5 connected with the wireless charging module 250. For ease of description, the same components as those described in regard to FIG. 1 are briefly described or omitted from the description.

The MST communication module 210 may receive a signal containing control information or payment information such as card information from the processor 120, generate a magnetic signal corresponding to the received signal, and then transfer the generated magnetic signal to the external electronic device 102 (e.g., a point-of-sale (POS) device) via the MST antenna 197-1. To generate the magnetic signal, according to an embodiment, the MST communication module 210 may include a switching module (not shown) that includes one or more switches connected with the MST antenna 197-1, and control the switching module to change the direction of voltage or current supplied to the MST antenna 197-1 according to the received signal. The change of the direction of the voltage or current allows the direction of the magnetic signal (e.g., a magnetic field) emitted from the MST antenna 197-1 to change accordingly. If detected at the external electronic device 102, the magnetic signal with its direction changing may cause an effect (e.g., a waveform) similar to that of a magnetic field that is generated when a magnetic card corresponding to the card information associated with the received signal is swiped through a card reader of the electronic device 102. According to an embodiment, for example, payment-related information and a control signal that are received by the electronic device 102 in the form of the magnetic signal may be further transmitted to an external server 108 (e.g., a payment server) via the network 199.

The NFC communication module 230 may obtain a signal containing control information or payment information such as card information from the processor 120 and transmit the obtained signal to the external electronic device 102 via the NFC antenna 197-3. According to an embodiment, the NFC communication module 230 may receive such a signal transmitted from the external electronic device 102 via the NFC antenna 197-3.

The wireless charging module 250 may wirelessly transmit power to the external electronic device 102 (e.g., a cellular phone or wearable device) via the wireless charging antenna 197-5, or wirelessly receive power from the external electronic device 102 (e.g., a wireless charging device). The wireless charging module 250 may support one or more of various wireless charging schemes including, for example, a magnetic resonance scheme or a magnetic induction scheme.

According to an embodiment, some of the MST antenna 197-1, the NFC antenna 197-3, or the wireless charging antenna 197-5 may share at least part of their radiators. For example, the radiator of the MST antenna 197-1 may be used as the radiator of the NFC antenna 197-3 or the wireless charging antenna 197-5, or vice versa. In such a case, the antenna module 197 may include a switching circuit (not shown) adapted to selectively connect (e.g., close) or disconnect (e.g. open) at least part of the antennas 197-1, 197-3, or 197-5, for example, under the control of the wireless communication module 192 (e.g., the MST communication module 210 or the NFC communication module 230) or the power management module (e.g., the wireless charging module 250). For example, when the electronic device 101 uses a wireless charging function, the NFC communication module 230 or the wireless charging module 250 may control the switching circuit to temporarily disconnect at least one portion of the radiators shared by the NFC antenna 197-3 and the wireless charging antenna 197-5 from the NFC antenna 197-3 and to connect the at least one portion of the radiators with the wireless charging antenna 197-5.

According to an embodiment, at least one function of the MST communication module 210, the NFC communication module 230, or the wireless charging module 250 may be controlled by an external processor (e.g., the processor 120). According to an embodiment, at least one specified function (e.g., a payment function) of the MST communication module 210 or the NFC communication module 230 may be performed in a trusted execution environment (TEE). According to an embodiment, the TEE may form an execution environment in which, for example, at least some designated area of the memory 130 is allocated to be used for performing a function (e.g., a financial transaction or personal information-related function) that requires a relatively high level of security. In such a case, access to the at least some designated area of the memory 130 may be restrictively permitted, for example, according to an entity accessing thereto or an application being executed in the TEE.

The electronic device according to certain embodiments may be one of certain types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that certain embodiments of the present disclosure and the terms used therein are not intended to limit the technological features set forth herein to particular embodiments and include certain changes, equivalents, or replacements for a corresponding embodiment.

With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Certain embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

The module or programming module of the present disclosure may include at least one of the aforementioned components with omission of some components or addition of other components. The operations of the modules, programming modules, or other components may be executed in series, in parallel, recursively, or heuristically. Also, some operations may be executed in different order, omitted, or extended with other operations.

Hereinafter, a method of pairing devices using near field communication (e.g., NFC module or NFC card emulation) and an electronic apparatus using the same according to various embodiments of the disclosure will be described with reference to the accompanying drawings.

Figure 3:
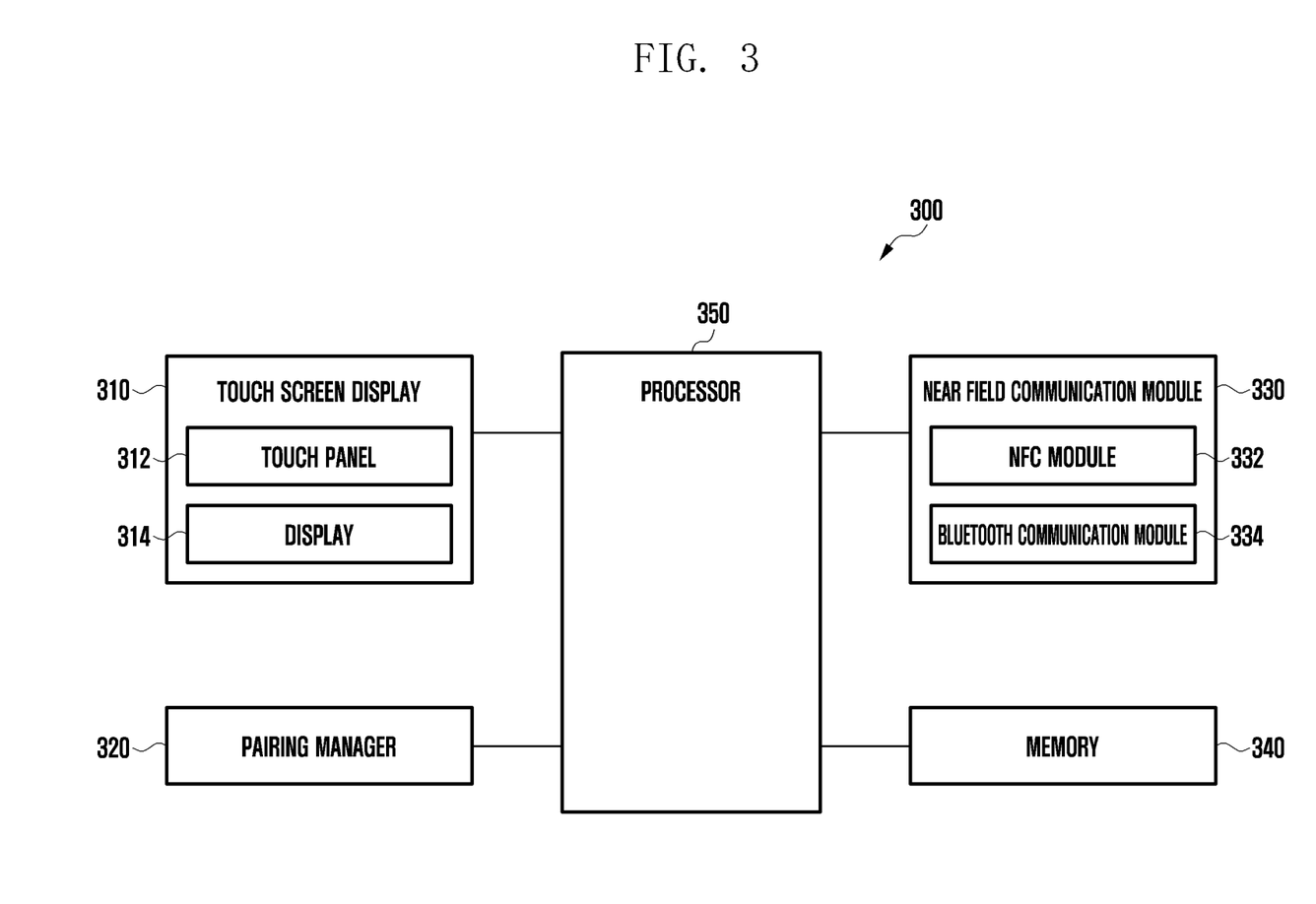
FIG. 3 is a block diagram schematically illustrating a configuration of an electronic apparatus that performs a method of pairing devices using near field communication according to various embodiments of the disclosure.

FIG. 3 is a block diagram schematically illustrating a configuration of an electronic apparatus that performs a method of pairing devices using near field communication according to various embodiments of the disclosure.

Referring to FIG. 3, the electronic apparatus 300 (e.g., the electronic apparatus 101 of FIG. 1) according to various embodiment of the disclosure may include a touch screen display 310 (e.g., the display device 160 of FIG. 1), a pairing manager 320, a near field communication module 330 (e.g., the communication module 190 of FIG. 1 or the wireless communication module 192 of FIG. 2), a memory 340 (e.g., the memory 130 of FIG. 1), and a processor 350 (e.g., the processor 120 of FIG. 1).

The touch screen display 310 may receive a signal input from outside through the electronic apparatus 300. For example, the input signal may be input through a user's finger of the electronic apparatus 300 or a pen. The touch screen display 310 may execute the pairing manager 320, based on the input signal of the electronic apparatus 300.

According to an embodiment, the touch screen display 310 may perform an input function and/or a display function. For example, the touch screen display 310 may include a touch panel 312 and a display 314. The touch panel 312 may be composed of a touch sensing sensor such as a capacitive overlay, a pressure resistive overlay, an infrared beam, or may be composed of a pressure sensor. In addition to the sensors, all kinds of sensor devices capable of detecting contact or pressure of an object may constitute the touch panel 312 of this embodiment. The touch panel 312 may detect a touch input of a user of the electronic apparatus 300 and generate a detection signal to transmit the same to the processor 350. The display 314 may be formed of a liquid crystal display (LCD), an organic light emitting diode (OLED), an active matrix organic light emitting diode (AMOLED), or the like, and may visually provide a menu of the electronic apparatus 300, input data, function configuration information, and various other information to the user.

The pairing manager 320 may activate a point of sale (POS) function of the electronic apparatus 300 installed in the memory 340. The pairing manager 320 may include a predetermined application for pairing the electronic apparatus 300 and an external electronic apparatus (e.g., the external electronic apparatus 400 of FIG. 4). According to an embodiment, the pairing manager 320 may be included in the memory 340 as a program (e.g., the program 140 of FIG. 1) or an application (e.g., the application 146 of FIG. 1).

The near field communication module 330 is for near field communication, and may include an NFC communication module 332 and a Bluetooth communication module 334.

Figure 4:
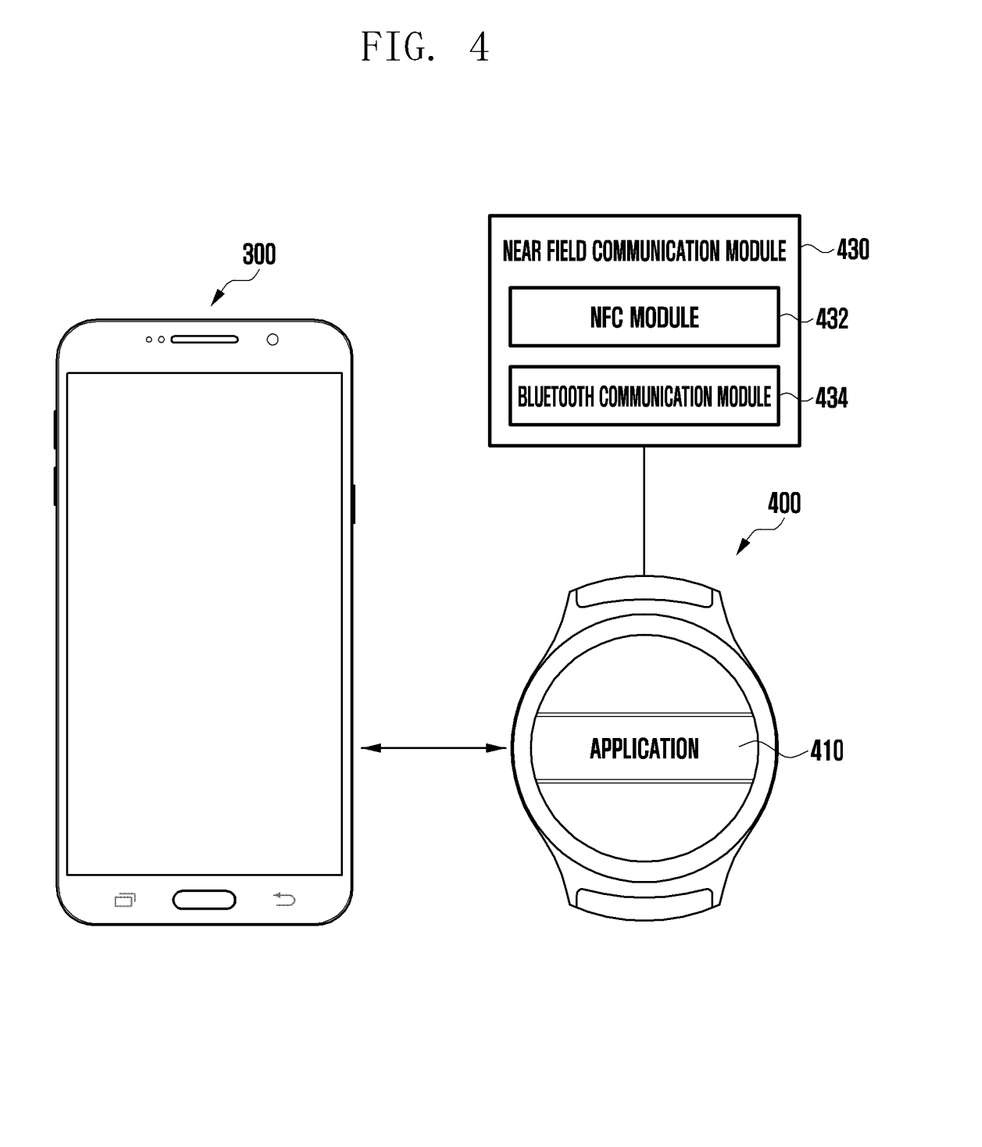
FIG. 4 is a diagram schematically illustrating a method of pairing an electronic apparatus and an external electronic apparatus using near field communication according to various embodiments of the disclosure.

The near field communication module 330 may support wireless communication between the electronic apparatus 300 and an external electronic apparatus (e.g., the external electronic apparatus 400 of FIG. 4). The external electronic apparatus 400 may include a wearable device such as a smart watch.

According to an embodiment, the near field communication module 330 may support near field communication using at least one of radio frequency identification (RFID), infrared data association, ultra-wideband (UWB), ZigBee, wireless-fidelity (Wi-Fi), Wi-Fi Direct, and wireless universal serial bus (USB) module.

The NFC communication module 332 may perform data communication with an external electronic apparatus 400 located within a distance of about 10 cm using a contactless data transmission technology related to radio frequency identification (RFID). According to an embodiment, the NFC communication module 332 may perform communication with the external electronic apparatus 400 that supports near field communication (e.g., NFC communication) and uses at least one of a reader mode, a card emulation mode, and a peer-to-peer mode. The electronic apparatus 300 according to various embodiments of the disclosure may perform near field communication with the external electronic apparatus 400 using, for example, a card emulation mode.

The NFC communication module 332 may form an NFC link through tagging with an NFC communication module of an external electronic apparatus within an NFC communication range. According to an embodiment, the NFC communication module 332 may be a first wireless communication module supporting first wireless communication. The first wireless communication may support the NFC protocol.

When the NFC communication module 332 operates in the card emulation mode, the NFC communication module 332 of the electronic apparatus 300 may perform the function of an NFC tag reader, and the NFC communication module of the external electronic apparatus may perform the function of an NFC tag.

The Bluetooth communication module 334 may perform data communication with an external electronic apparatus within a near field (e.g., about 100 m) using Bluetooth, which is one of the near field wireless communication protocols. According to an embodiment, the Bluetooth communication module 334 may be a second wireless communication module supporting second wireless communication. The second wireless communication may support the Bluetooth protocol.

The memory 340 may store source data that can drive the pairing manager 320 and instructions related to the force function of the electronic apparatus 300.

According to an embodiment, the memory 340 may store a program that controls the overall operation of the electronic apparatus 300. The memory 340 may store a program, an operating system (OS), various applications, and input/output data for processing and control of the processor 350. The memory 340 may store a user interface (UI) provided by the electronic apparatus 300 and various configuration information required when processing functions in the electronic apparatus 300.

The processor 350 may be connected to the touch screen display 310, the pairing manager 320, the near field communication module 330, and the memory 340 included in the electronic apparatus 300 to control functions and operations. The processor 350 may perform operations related to pairing of the electronic apparatus 300 and an external electronic apparatus according to various embodiments of the disclosure.

According to an embodiment, the processor 350 may perform a function of controlling the overall operation of the electronic apparatus 300 and signal flow between internal components, and processing data. The processor 350 may include, for example, a central processing unit (CPU), an application processor, and a communication processor. The processor 350 may be formed with a single core processor or a multi-core processor, and may be composed of at least one processor.

FIG. 4 is a diagram schematically illustrating a method of pairing an electronic apparatus and an external electronic apparatus using near field communication (e.g., an NFC communication module or NFC card emulation) according to various embodiments of the disclosure.

According to an embodiment, the external electronic apparatus 400 of FIG. 4 may include a near field communication module 430 performing the same function as the near field communication module 330 included in the electronic apparatus 300 of FIG. 3. The near field communication module 430 of the external electronic apparatus 400 may include an NFC communication module 432 and a Bluetooth communication module 434. In addition, the external electronic apparatus 400 may further include components performing functions similar to the touch screen display 310, the memory 340, and the processor 350 included in the electronic apparatus 300 of FIG. 3.

According to an embodiment, the NFC communication module 432 may be a first wireless communication module supporting first wireless communication. The first wireless communication may support the NFC protocol. The Bluetooth communication module 434 may be a second wireless communication module supporting second wireless communication. The second wireless communication may support the Bluetooth protocol.

Referring to FIG. 4, the external electronic apparatus 400 according to various embodiments of the disclosure may include an application 410. The application 410 may include a set up wizard application. The application 410 may be activated by calling an NFC application programming interface (API) that is open to the public. The application 410 may display a Bluetooth address before the external electronic apparatus 400 is paired with the electronic apparatus 300. According to an embodiment, the application 410 may include various software used by a user running on a computer operating system (OS) or a mobile OS.

According to an embodiment, the external electronic apparatus 400, in the state where the NFC communication module 432 is activated (on), may change the mode to the card emulation mode when the application 410 (e.g., the set up wizard application) is executed, even in the reader mode or the peer-to-peer mode, not in the card emulation mode.

Referring to FIG. 4, when the external electronic apparatus 400 is tagged in the electronic apparatus 300 according to various embodiments of the disclosure, the electronic apparatus 300 and the external electronic apparatus 400 may be connected to each other through the NFC communication modules 332 and 432 to perform NFC communication. In the case that the electronic apparatus 300 and the external electronic apparatus 400 perform NFC communication, when the external electronic apparatus 400 transmits the Bluetooth address of the external electronic apparatus 400 to the electronic apparatus 300 through the NFC communication module 432, the electronic apparatus 300 and the external electronic apparatus 400 may be paired with each other. For example, the electronic apparatus 300 may perform pairing with the Bluetooth communication module 434 of the external electronic apparatus 400 through the Bluetooth communication module 334.

According to various embodiments, when the external electronic apparatus 400 is tagged on the electronic apparatus 300, the processor 350 of the electronic apparatus 300 may display a user interface, such as, for example, "Start Bluetooth pairing", on the touch screen display 310. When pairing of the electronic apparatus 300 and the external electronic apparatus 400 is completed, the processor 350 of the electronic apparatus 300 may display a user interface, such as, for example, "Connected to the external electronic apparatus 400" on the touch screen display 310.

According to an embodiment, the electronic apparatus 300 according to various embodiments of the disclosure may include a first wireless communication module (e.g., the NFC communication module 332) for supporting a first wireless communication, a second wireless communication module (e.g., the Bluetooth communication module 334) for supporting a second wireless communication, a memory 340, and a processor 350 operatively connected to the first wireless communication module (e.g., the NFC communication module 332), the second wireless communication module (e.g., the Bluetooth communication module 334), and the memory 340, wherein the processor 350 may be configured to: detect a tag of an external electronic apparatus 400 through the first wireless communication module (e.g., the NFC communication module 332); transmit a first command for driving a designated application 410 of the external electronic apparatus 400 to the external electronic apparatus 400 through the first wireless communication module (e.g., the NFC communication module 332); receive Bluetooth address information of the external electronic apparatus 400 corresponding to the driving of the designated application 410 through the first wireless communication module (e.g., the NFC communication module 332); and perform pairing with the external electronic apparatus 400 through the second wireless communication module (e.g., the Bluetooth communication module 334), based on the received Bluetooth address information.

According to various embodiments, the processor 350 may be configured to execute a predetermined application for pairing with the external electronic apparatus 400 when the tag of the external electronic apparatus 400 is detected.

According to various embodiments, the processor 350 may be configured to activate a POS function installed in the memory 340 when the predetermined application is executed.

According to various embodiments, the processor 350 may be configured to emit a radio frequency signal to the external electronic apparatus 400 through the first wireless communication module (e.g., the NFC communication module 332) to be connected to the external electronic apparatus 400 through the first wireless communication, when the tag of the external electronic apparatus 400 is detected.

According to various embodiments, the first wireless communication supports a near field communication (NFC) protocol, and the second wireless communication supports a Bluetooth protocol.

According to various embodiments, the processor 350 may be configured to receive a first response signal indicating that the designated application 410 is normally executed in the external electronic apparatus 400 through the first wireless communication module (e.g., the NFC communication module 332).

According to various embodiments, the processor 350 may be configured to transmit a second command for identifying a Bluetooth address of the external electronic apparatus 400 to the external electronic apparatus 400 through the first wireless communication module (e.g., the NFC communication module 332).

According to various embodiments, the processor 350 may be configured to receive a second response signal including the Bluetooth address through the first wireless communication module (e.g., the NFC communication module 332).

According to various embodiments, the first command includes a protocol used in an NFC card emulation.

According to an embodiment, an electronic apparatus (e.g., the external electronic apparatus 400) according to various embodiments of the disclosure may include a first wireless communication module (e.g., the NFC communication module 432) for supporting a first wireless communication, a second wireless communication module (e.g., the Bluetooth communication module 434) for supporting a second wireless communication, a memory, and a processor operatively connected to the first wireless communication module (e.g., the NFC communication module 432), the second wireless communication module (e.g., the Bluetooth communication module 434), and the memory, wherein the processor may be configured to: receive a first command for driving a designated application 410 stored in the memory from the external electronic apparatus (e.g., the electronic apparatus 300) through the first wireless communication module (e.g., the NFC communication module 432); drive the designated application 410; transmit a response signal for the first command through the first wireless communication module (e.g., the NFC communication module 432); receive a second command for requesting Bluetooth address information of the electronic apparatus (e.g., the external electronic apparatus 400) from the external electronic apparatus (e.g., the electronic apparatus 300) through the first wireless communication module (e.g., the NFC communication module 432); and perform pairing with the external electronic apparatus (e.g., the electronic apparatus 300) through a second wireless communication module (e.g., the Bluetooth communication module 434).

According to various embodiments, the first wireless communication may support a near field communication (NFC) protocol, and the second wireless communication may support a Bluetooth protocol.

According to various embodiments, the processor of the electronic apparatus (e.g., the external electronic apparatus 400) may be configured to receive a radio frequency signal emitted from the external electronic apparatus (e.g., the electronic apparatus 300) through the first wireless communication module (e.g., the NFC communication module 432) to be connected to the external electronic apparatus (e.g., the electronic apparatus 300) when the electronic apparatus (e.g., the external electronic apparatus 400) is tagged on the external electronic apparatus (e.g., the electronic apparatus 300).

According to various embodiments, the first command may include an association identifier of the designated application 410, and the processor of the electronic apparatus (e.g., the external electronic apparatus 400) may be configured to extract the association identifier from the first command, and execute the application registered as the association identifier.

Figure 5:
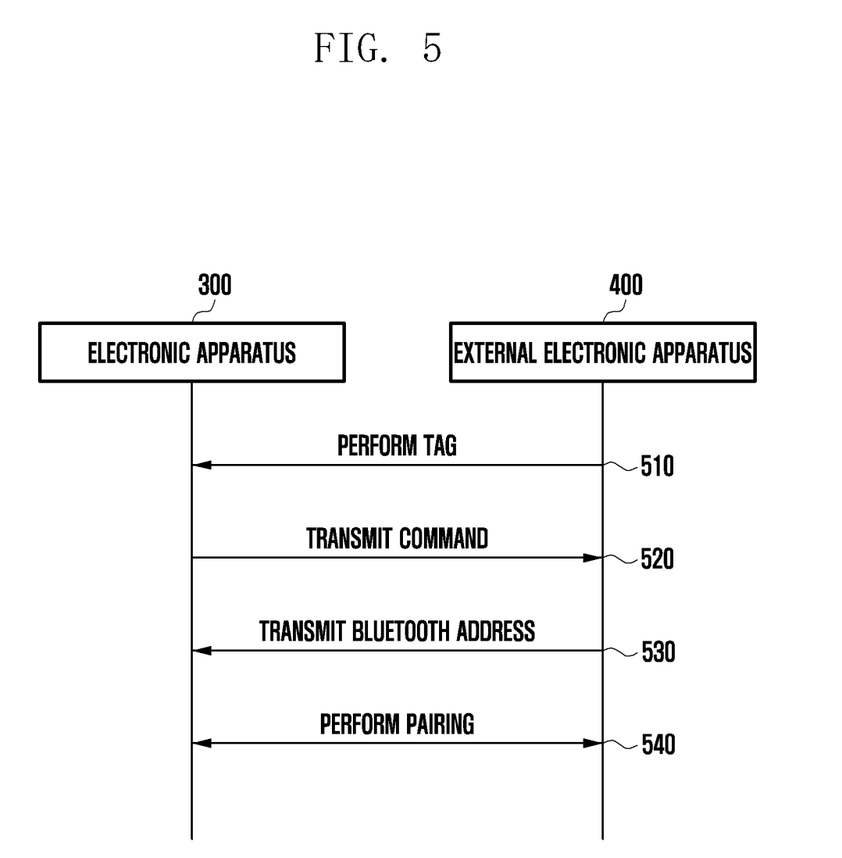
FIG. 5 is a diagram illustrating an operation of pairing an electronic apparatus and an external electronic apparatus using near field communication according to various embodiments of the disclosure.

FIG. 5 is a diagram illustrating an operation of pairing an electronic apparatus and an external electronic apparatus using near field communication (e.g., an NFC communication module or an NFC card emulation) according to various embodiments of the disclosure.

In FIG. 5, the electronic apparatus 300 may be an electronic apparatus such as a mobile terminal. The electronic apparatus 300 may perform the functions of an NFC tag reader. The external electronic apparatus 400 may be an electronic apparatus such as a wearable device (e.g., a smart watch). The external electronic apparatus 400 may perform the functions of an NFC tag.

In operation 510, the external electronic apparatus 400 may perform a tag for pairing with the electronic apparatus 300.

According to an embodiment, when the external electronic apparatus 400 is tagged on the electronic apparatus 300, the electronic apparatus 300 and the external electronic apparatus 400 may be connected by a first communication method (e.g., NFC method) to transmit and receive data.

In operation 520, when the tag of the external electronic apparatus 400 is detected while the NFC communication module 332 is activated (on), the electronic apparatus 300 may transmit a command (e.g., a select command) for driving the designated application 410 of the external electronic apparatus 400 for pairing to the external electronic apparatus 400 through a first communication method (e.g., NFC method). For example, the designated application 410 may be an application for controlling the operation of the external electronic apparatus 400 such that the external electronic apparatus 400 performs pairing with the electronic apparatus 300.

According to an embodiment, the electronic apparatus 300 may transmit a select command including an association identifier of the application 410 stored in the memory 340 to the external electronic apparatus 400 using a designated communication method in order to drive the designated application 410. According to an embodiment, the select command transmitted to the external electronic apparatus 400 using the designated communication method (e.g., ISO 7816) may include a protocol used in NFC card emulation. According to an embodiment, the processor 350 of the electronic apparatus 300 may manage the application 410 transmitted to the external electronic apparatus 400. For example, the electronic apparatus 300 may include an application managing the application 410 installed in the external electronic apparatus 400 (e.g., a wearable device). Also, when the application 410 is installed, the external electronic apparatus 400 may install the designated application 410 through the electronic apparatus 300. Also, the external electronic apparatus 400 may receive information about the designated application 410 through pairing with the electronic apparatus 300.

In operation 530, when the external electronic apparatus 400 receives the command from the electronic apparatus 300, the external electronic apparatus 400 may transmit Bluetooth address information corresponding to driving of the designated application 410 to the electronic apparatus 300 through the NFC communication module 432.

According to an embodiment, the Bluetooth address may be a unique identifier possessed by the external electronic apparatus 400. For example, external electronic apparatuses 400 such as a headset and a smart watch may each have unique Bluetooth address values.

According to an embodiment, when the external electronic apparatuses 400 receives a select command from the electronic apparatus 300 in operation 520, the external electronic apparatus 400 may activate the Bluetooth communication module 434 of the external electronic apparatus 400.

In operation 540, when the Bluetooth address information is received from the external electronic apparatus 400, the electronic apparatus 300 may activate the Bluetooth communication module 334 and perform pairing with the external electronic apparatus 400 through a second communication method (e.g., Bluetooth communication method).

Figure 6:
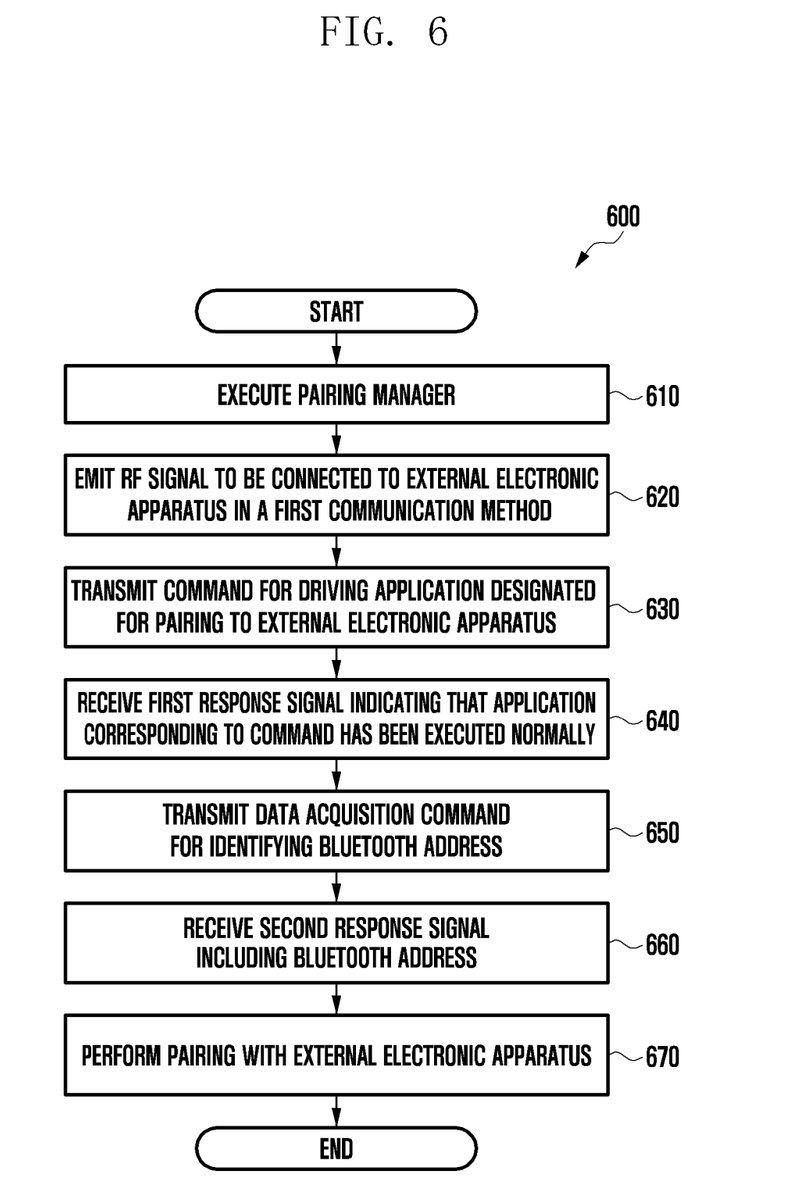
FIG. 6 is a flowchart illustrating a method for an electronic apparatus to pair with an external electronic apparatus using near field communication according to various embodiments of the disclosure.

FIG. 6 is a flowchart 600 illustrating a method for an electronic apparatus to pair with an external electronic apparatus using near field communication (e.g., the NFC communication module or the NFC card emulation) according to various embodiments of the disclosure.

In operation 610, the processor 350 of the electronic apparatus 300 may execute the pairing manager 320.

According to an embodiment, when the pairing manager 320 is executed, the processor 350 may activate the NFC communication module 332.

According to an embodiment, when the pairing manager 320 is executed, the processor 350 may activate a POS function of the electronic apparatus 300 installed in the memory 340.

In operation 620, the processor 350 of the electronic apparatus 300 may emit a radio frequency signal to the external electronic apparatus 400 through the NFC communication module 332 to be connected to the external electronic apparatus 400 in a first communication method (e.g., NFC method). For example, when the tag of the external electronic apparatus 400 is detected while the NFC communication module 332 of the electronic apparatus 300 is activated, the electronic apparatus 300 and the external electronic apparatus 400 may be connected by a first communication method (e.g., NFC method) to transmit and receive data.

In operation 630, the processor 350 of the electronic apparatus 300 may transmit a command (e.g., a first command) for driving the application 410 designated for pairing to the external electronic apparatus 400.

According to an embodiment, the processor 350 of the electronic apparatus 300 may transmit the command to the external electronic apparatus 400 using a designated communication method (e.g., ISO 7816). According to an embodiment, the command may include a select command including an association identifier of the designated application 410.

According to an embodiment, the select command may include a data structure as shown in [Table 1] below. For example, the association identifier may be stored in a data field of [Table 1] and transmitted to the external electronic apparatus 400 together with the select command.

TABLE 1

| CLA | '00' |
|---|---|
| INS | 'A4' |
| P1 | 0 |
| P2 | 4 |
| Lc field | Empty or length of the subsequent data field |
| Data field | Association Identifier |
| Le field | Empty or maximum length of data expected in response |

In operation 640, the processor 350 of the electronic apparatus 300 may receive a first response signal indicating that the application 410 of the external electronic apparatus 400 corresponding to the command is normally executed from the external electronic apparatus 400.

In operation 650, the processor 350 of the electronic apparatus 300 may transmit a data acquisition command (e.g., a second command) for identifying the Bluetooth address of the application 410 corresponding to the first response signal to the external electronic apparatus 400.

For example, the data acquisition command may include a data structure as shown in [Table 2] below.

TABLE 2

| CLA | '00' |
|---|---|
| INS | 'CA' |
| P1-P2 | 0-4 |
| Lc field | Empty |
| Data field | Empty |
| Le field | Number of bytes expected in response |

In operation 660, the processor 350 of the electronic apparatus 300 may receive a second response signal including the Bluetooth address of the external electronic apparatus 400 corresponding to the data acquisition command.

For example, the second response signal including the Bluetooth address may include data such as "0000 07 9F3602000F 9000" in the data field. In the data field, '0000 07' may represent a 7-byte response signal, '9F3602000F' may represent a Bluetooth address transmitted from the application 410 of the external electronic apparatus 400, and '9000' may indicate that the second response signal has been normally transmitted to the electronic apparatus 300 after the external electronic apparatus 400 receives the data acquisition command of the electronic apparatus 300.

According to an embodiment, the second response signal such as "0000 07 9F3602000F 9000" may be stored in a data field of the data acquisition command and transmitted to the electronic apparatus 300.

In operation 670, the electronic apparatus 300 may activate the Bluetooth communication module 334 by the processor 350, and perform pairing with the external electronic apparatus 400 through a second communication method (e.g., Bluetooth communication method).

Figure 7:
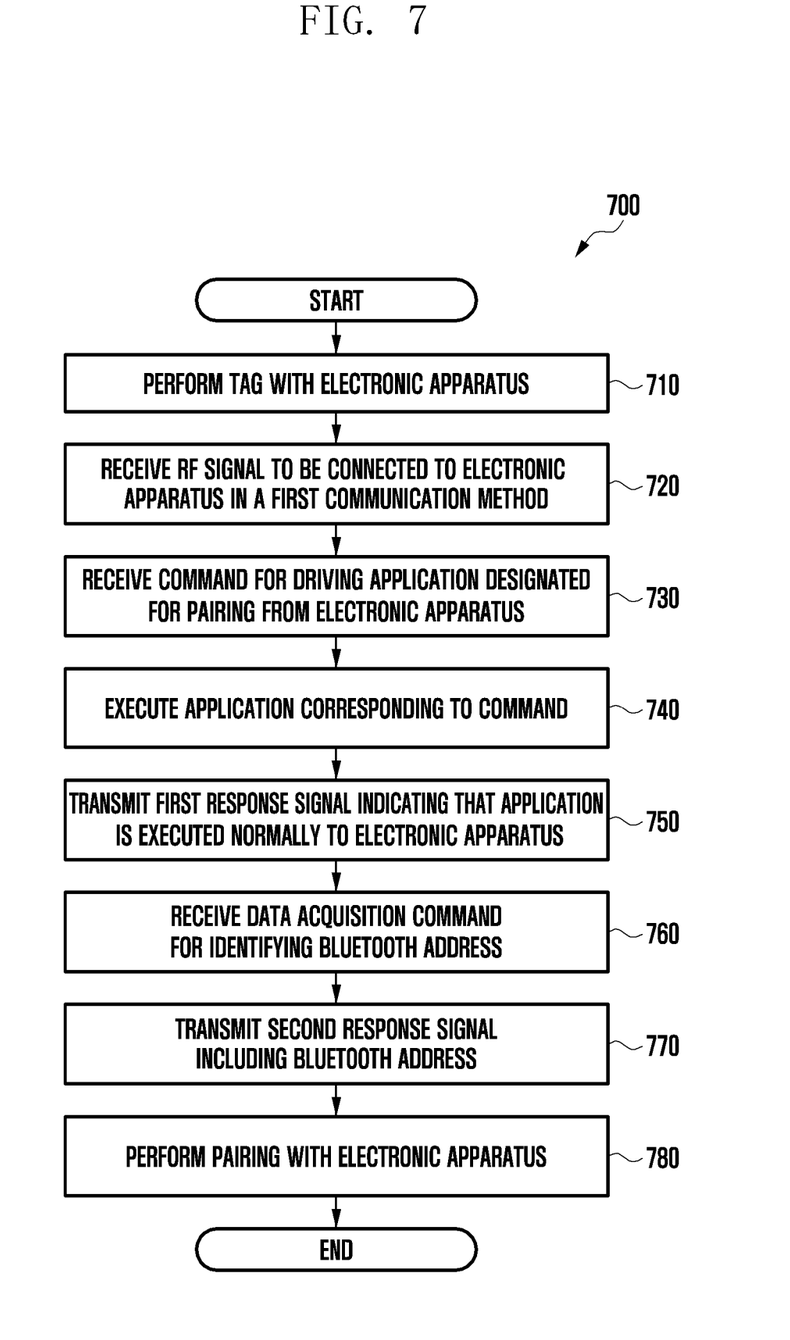
FIG. 7 is a flowchart illustrating a method of pairing an external electronic apparatus with an electronic apparatus using near field communication according to various embodiments of the disclosure.

FIG. 7 is a flowchart 700 illustrating a method of pairing an external electronic apparatus with an electronic apparatus using near field communication (e.g., an NFC communication module or an NFC card emulation) according to various embodiments of the disclosure.

According to an embodiment, the external electronic apparatus 400 may perform a pairing operation with the electronic apparatus 300 through a processor performing a function similar to the processor 350 included in the electronic apparatus 300 of FIG. 3.

In operation 710, the external electronic apparatus 400 may perform a tag with the electronic apparatus 300 while the NFC communication module 432 is activated.

In operation 720, the external electronic apparatus 400 may receive a radio frequency signal from the electronic apparatus 300, and may be connected to the electronic apparatus 300 by a first communication method (e.g., NFC method).

In operation 730, the external electronic apparatus 400 may receive a command (e.g., a first command) for driving the application 410 designated for pairing from the electronic apparatus 300.

In operation 740, the external electronic apparatus 400 may extract an association identifier from a command for driving the designated application 410, and execute the application 410 registered as the association identifier.

According to an embodiment, the application 410 may include a set up wizard application. The application 410 may be activated by calling an NFC application programming interface (API) that is open to the public.

In operation 750, the external electronic apparatus 400 may transmit a first response signal to the electronic apparatus 300 indicating that the application 410 registered as the association identifier is normally executed.

In operation 760, the external electronic apparatus 400 may receive a data acquisition command (e.g., a second command) for checking the Bluetooth address from the electronic apparatus 400. For example, the external electronic apparatus 400 may identify Bluetooth address information of the external electronic apparatus 400 through the application 410.

In operation 770, the external electronic apparatus 400 may transmit a second response signal including the Bluetooth address corresponding to the received data acquisition command to the electronic apparatus 300. For example, the external electronic apparatus 400 may transmit a second response signal including a Bluetooth address to the electronic apparatus 300 through the NFC communication module 432. According to an embodiment, the processor of the external electronic apparatus 400 may activate the Bluetooth module 434 of the external electronic apparatus 400 when receiving the second command from the electronic apparatus 300.

In operation 780, the external electronic apparatus 400 may perform pairing with the electronic apparatus 300 through a second communication method (e.g., Bluetooth communication method) through the Bluetooth communication module 434.

According to an embodiment, a method for an electronic apparatus 300 according to various embodiments of the disclosure to pair with an external electronic apparatus 400 may include detecting a tag of the external electronic apparatus 400 through a first wireless communication module (e.g., an NFC communication module 332), transmitting a first command for driving a designated application 410 of the external electronic apparatus 400 to the external electronic apparatus 400 through the first wireless communication module (e.g., the NFC communication module 332), receiving a first response signal indicating that the designated application 410 is executed from the external electronic apparatus 400 through the first wireless communication module (e.g., the NFC communication module 332), transmitting a second command for requesting Bluetooth address information of the external electronic apparatus 400 through the first wireless communication module (e.g., the NFC communication module 332), receiving the Bluetooth address information through the first wireless communication module (e.g., the NFC communication module 332), and performing pairing with the external electronic apparatus 400 through a second wireless communication module (e.g., a Bluetooth communication module 334), based on the Bluetooth address information.

According to various embodiments, the electronic apparatus 300 may further include executing a predetermined application, and the electronic apparatus 300 may further include activating a point of sale (POS) function installed in a memory 340, when the predetermined application is executed.

According to various embodiments, the electronic apparatus 300 may include emitting a radio frequency signal to the external electronic apparatus 400 to be connected to the external electronic apparatus 400 through the first wireless communication module (e.g., the NFC communication module 332), when the tag of the external electronic apparatus 400 is detected.

According to various embodiments, the first wireless communication may support a near field communication (NFC) protocol, and the second wireless communication may support a Bluetooth protocol.

According to various embodiments, the first command may include an association identifier of the designated application 410.

According to various embodiments, the electronic apparatus 300 may further include receiving a second response signal including the Bluetooth address of the external electronic apparatus 400 corresponding to the second command.

According to various embodiments, the external electronic apparatus 400 may include extracting the association identifier from the first command, and executing the application 410 registered as the association identifier.

According to various embodiments of the disclosure, as the external electronic apparatus 400 desired to be paired is tagged on the electronic apparatus 300, pairing can be easily performed, and the external electronic apparatus 400 desired to be paired can be intuitively selected.

In the above, the disclosure has been described in accordance with various embodiments of the disclosure, but those skilled in the art to which the disclosure pertains also include modifications and modifications within the scope of the disclosure without departing from the technical spirit of the disclosure.

The invention claimed is:

1. An electronic apparatus comprising:
 a first wireless communication module for supporting a first wireless communication;
 a second wireless communication module for supporting a second wireless communication;
 a memory; and
 a processor operatively connected to the first wireless communication module, the second wireless communication module, and the memory,
 wherein the processor is configured to:
  detect a tag of an external electronic apparatus through the first wireless communication module,
  transmit a first command for driving a designated application of the external electronic apparatus to the external electronic apparatus through the first wireless communication module,
  receive Bluetooth address information of the external electronic apparatus corresponding to the driving of the designated application through the first wireless communication module, and perform pairing with the external electronic apparatus through the second wireless communication module, based on the received Bluetooth address information, and wherein the first command is further configured to cause the external electronic apparatus to change a mode from a reader mode or a peer-to-peer mode state to a card emulation mode state.

2. The electronic apparatus of claim 1, wherein the processor is configured to execute a predetermined application for pairing with the external electronic apparatus when the tag of the external electronic apparatus is detected.

3. The electronic apparatus of claim 2, wherein the processor is configured to activate a POS function installed in the memory when the predetermined application is executed.

4. The electronic apparatus of claim 1, wherein the processor is configured to emit a radio frequency signal to the external electronic apparatus through the first wireless communication module to be connected to the external electronic apparatus through the first wireless communication, when the tag of the external electronic apparatus is detected.

5. The electronic apparatus of claim 1, wherein the first wireless communication supports a near field communication (NFC) protocol, and the second wireless communication supports a Bluetooth protocol.

6. The electronic apparatus of claim 1, wherein the processor is configured to receive a first response signal indicating that the designated application is normally executed in the external electronic apparatus through the first wireless communication module.

7. The electronic apparatus of claim 6, wherein the processor is configured to transmit a second command for identifying a Bluetooth address of the external electronic apparatus to the external electronic apparatus through the first wireless communication module, and receive a second response signal including the Bluetooth address through the first wireless communication module.

8. The electronic apparatus of claim 1, wherein the first command comprises a protocol used in an NFC card emulation.

9. A method for an electronic apparatus to pair with an external electronic apparatus, the method comprising:

detecting a tag of an external electronic apparatus through a first wireless communication module, transmitting a first command for driving a designated application of the external electronic apparatus to the external electronic apparatus through the first wireless communication module, receiving a first response signal indicating that the designated application is executed from the external electronic apparatus through the first wireless communication module;

transmitting a second command for requesting Bluetooth address information of the external electronic apparatus through the first wireless communication module;

receiving the Bluetooth address information through the first wireless communication module; and performing pairing with the external electronic apparatus through a second wireless communication module, based on the Bluetooth address information, wherein the first command is further configured to cause the external electronic apparatus to change a mode from a reader mode or a peer-to-peer mode state to a card emulation mode state.

10. The method of claim 9, further comprising:

executing a predetermined application, by the electronic apparatus, and activating a point of sale (POS) function installed in a memory, by the electronic apparatus, when the predetermined application is executed.

11. The method of claim 9, further comprising:

emitting a radio frequency signal to the external electronic apparatus to be connected to the external electronic apparatus through the first wireless communication module, by the electronic apparatus, when the tag of the external electronic apparatus is detected.

12. The method of claim 9, wherein the first wireless communication supports a near field communication (NFC) protocol, and the second wireless communication supports a Bluetooth protocol.

13. The method of claim 9, wherein the first command comprises an association identifier of the designated application.

14. The method of claim 13, further comprising:

extracting the association identifier from the first command, and executing the application registered as the association identifier, by the electronic apparatus.

15. The method of claim 9, further comprising:

receiving a second response signal including the Bluetooth address of the external electronic apparatus corresponding to the second command, by the electronic apparatus.

* * * * *